US009739891B2

United States Patent
Kennedy et al.

(10) Patent No.: US 9,739,891 B2
(45) Date of Patent: Aug. 22, 2017

(54) SYSTEM AND METHOD OF USING MEASUREMENTS OF OPPORTUNITY WITH VECTOR TRACKING FILTERS FOR IMPROVED NAVIGATION

(71) Applicants: Joseph P. Kennedy, Great Falls, VA (US); John P. Carlson, Sterling, VA (US)

(72) Inventors: Joseph P. Kennedy, Great Falls, VA (US); John P. Carlson, Sterling, VA (US)

(73) Assignee: Echo Ridge LLC, Sterling, VA (US)

( * ) Notice: Subject to any disclaimer, the term of this patent is extended or adjusted under 35 U.S.C. 154(b) by 356 days.

(21) Appl. No.: 14/328,180

(22) Filed: Jul. 10, 2014

(65) Prior Publication Data

US 2015/0048972 A1    Feb. 19, 2015

Related U.S. Application Data

(63) Continuation-in-part of application No. 13/250,134, filed on Sep. 30, 2011, and a continuation-in-part of application No. 13/909,824, filed on Jun. 4, 2013.

(60) Provisional application No. 61/844,605, filed on Jul. 10, 2013.

(51) Int. Cl.
*G01S 19/42* (2010.01)
*G01S 19/46* (2010.01)
*G01S 5/02* (2010.01)

(52) U.S. Cl.
CPC ............ *G01S 19/46* (2013.01); *G01S 5/0242* (2013.01); *G01S 5/0252* (2013.01); *G01S 5/0289* (2013.01)

(58) Field of Classification Search
CPC .............................. G01S 19/46; G01S 5/0242
USPC ............... 342/357.2–357.23, 464; 455/456.5
See application file for complete search history.

(56) References Cited

U.S. PATENT DOCUMENTS

| | | | |
|---|---|---|---|
| 5,794,128 A | 8/1998 | Brockel et al. | |
| 5,917,449 A | 6/1999 | Sanderford et al. | |
| 6,094,168 A | 7/2000 | Duffett-Smith et al. | |
| 6,275,705 B1 | 8/2001 | Drane et al. | |
| 6,313,789 B1* | 11/2001 | Zhodzishsky | G01S 19/29 342/357.68 |
| 6,393,292 B1 | 5/2002 | Lin | |
| 6,492,945 B2* | 12/2002 | Counselman, III | G01S 5/10 342/464 |
| 6,522,890 B2 | 2/2003 | Drane et al. | |
| 6,571,082 B1 | 5/2003 | Rahman et al. | |
| 6,865,395 B2 | 3/2005 | Riley | |
| 6,978,131 B1 | 12/2005 | Lee | |
| 7,035,650 B1 | 4/2006 | Moskowitz et al. | |

(Continued)

FOREIGN PATENT DOCUMENTS

| | | |
|---|---|---|
| WO | 2007113086 A1 | 10/2007 |
| WO | 2008119635 A1 | 10/2008 |
| WO | 2009112293 A1 | 9/2009 |

OTHER PUBLICATIONS

Derek Kurth, "Range-Only Robot Localization and SLAM with Radio", Robotics Institute, Carnegie Mellon University, May 2004, 60 pgs.

*Primary Examiner* — Marcus Windrich
(74) *Attorney, Agent, or Firm* — Duane Morris LLP (57) ABSTRACT

A system and method to opportunistically use measurements on a priori unknown radio signals, not intended for radio navigation or geolocation, to improve navigation/geolocation position estimation yield accuracy and efficiency.

12 Claims, 7 Drawing Sheets

(56) References Cited

U.S. PATENT DOCUMENTS

| | | |
|---|---|---|
| 7,171,345 B2 | 1/2007 | Mocek |
| 7,398,086 B2 | 7/2008 | Morgand et al. |
| 7,620,368 B2 | 11/2009 | Wang et al. |
| 7,773,995 B2 | 8/2010 | Rappaport et al. |
| 8,000,656 B1 | 8/2011 | Jiao et al. |
| 8,018,383 B1 * | 9/2011 | Schantz ............... G01S 5/0221 342/453 |
| 8,086,187 B1 | 12/2011 | Davis et al. |
| 8,126,453 B2 | 2/2012 | Wang |
| 8,229,416 B2 | 7/2012 | Akman et al. |
| 8,270,910 B2 | 9/2012 | Picard |
| 8,332,198 B1 | 12/2012 | Barclay et al. |
| 8,339,142 B2 | 12/2012 | Oowada |
| 8,843,077 B2 | 9/2014 | Haran |
| 2002/0160717 A1 | 10/2002 | Persson et al. |
| 2005/0085223 A1 | 4/2005 | Liu |
| 2005/0197769 A1 * | 9/2005 | Soehren ............... G01C 21/165 701/472 |
| 2005/0200525 A1 | 9/2005 | Duffett-Smith et al. |
| 2005/0260962 A1 | 11/2005 | Nazrul et al. |
| 2006/0094365 A1 | 5/2006 | Inogai et al. |
| 2006/0128315 A1 | 6/2006 | Belcea |
| 2006/0148429 A1 | 7/2006 | Inogai et al. |
| 2006/0174162 A1 | 8/2006 | Varadarajan et al. |
| 2006/0229018 A1 | 10/2006 | Mlinarsky et al. |
| 2006/0229020 A1 | 10/2006 | Mlinarsky et al. |
| 2007/0019769 A1 | 1/2007 | Green et al. |
| 2007/0072552 A1 | 3/2007 | Jonsson et al. |
| 2007/0127559 A1 | 6/2007 | Chang |
| 2007/0223571 A1 | 9/2007 | Viss |
| 2008/0026748 A1 | 1/2008 | Alexander et al. |
| 2008/0057873 A1 | 3/2008 | Huang et al. |
| 2008/0084951 A1 | 4/2008 | Chen et al. |
| 2009/0094492 A1 | 4/2009 | Music et al. |
| 2009/0113245 A1 | 4/2009 | Conner |
| 2009/0213828 A1 | 8/2009 | Brundage et al. |
| 2009/0233621 A1 | 9/2009 | Rhoads et al. |
| 2009/0281729 A1 * | 11/2009 | Duffett-Smith ......... G01S 19/46 701/469 |
| 2010/0062722 A1 | 3/2010 | Dykema et al. |
| 2010/0099361 A1 | 4/2010 | Lundstrom et al. |
| 2011/0037650 A1 * | 2/2011 | Lennen ................. G01S 19/33 342/357.63 |
| 2011/0124295 A1 | 5/2011 | Mahjoubi Amine et al. |
| 2011/0136457 A1 | 6/2011 | Yu |
| 2011/0223869 A1 | 9/2011 | Harteneck |
| 2011/0287721 A1 | 11/2011 | Haran |
| 2011/0306306 A1 | 12/2011 | Reed |
| 2012/0071107 A1 | 3/2012 | Falck et al. |
| 2012/0225624 A1 | 9/2012 | Kyosti et al. |
| 2013/0029608 A1 | 1/2013 | Kuo et al. |
| 2013/0231060 A1 | 9/2013 | Ozaki et al. |
| 2014/0051363 A1 | 2/2014 | Kennedy et al. |

* cited by examiner

SYSTEM AND METHOD OF USING MEASUREMENTS OF OPPORTUNITY WITH VECTOR TRACKING FILTERS FOR IMPROVED NAVIGATION

This application is a continuation-in-part of U.S. patent application Ser. No. 13/250,134 titled "System and Method for Robust Navigation and Geolocation Using Measurements of Opportunity" filed Sep. 30, 2011, and U.S. patent application Ser. No. 13/909,824 titled "Performance Improvements for Measurement of Opportunity Geolocation/Navigation Systems" filed Jun. 4, 2013, the disclosures of which are hereby incorporated by reference herein. This application also claims the priority of U.S. Provisional Application No. 61/844,605 filed Jul. 10, 2013.

The U.S. Government has a paid-up license in this invention and the right in limited circumstances to require the patent owner to license others on reasonable terms as provided for by the terms of Contract Nos. awarded by FA9453-12-M-0338 and FA8651-09-M-0100.

BACKGROUND

In both the military and commercial market places, there is an ever expanding use of radio-based geolocation/navigation devices (systems and methods described in this disclosure can be applied to both geolocation and navigation and are used interchangeably). Though they generally perform satisfactorily, in virtually every application there are instances where degraded accuracy or non-availability create dangerous situations. For military applications, degraded positional accuracy can affect the safety of troops or the navigation precision of a guided weapon. For commercial applications, the non-availability of GPS service inside a building can delay the arrival of emergency personnel to a 911 caller in distress.

Historically, much research has been done to improve the performance of GPS user equipment, yielding great gains in positional accuracy and availability. These activities have principally focused on improving the traditional functions in user equipment such as receiver sensitivity, reference oscillator stability, correlator speed, and signal processing algorithm performance. To create opportunities for large gains in performance, the present disclosure identifies new approaches and algorithms to apply to user equipment through aiding using augmentation sources including RF signals of opportunity (SoOPs). For the purposes of the present disclosure, a SoOP is a radio frequency (RF) transmission that is not intended for navigational position or timing purposes. Examples of SoOPs include cellular downlink broadcasts, WiFi access points, television signals, terrestrial radio AM and FM signals, etc. Therefore, the present disclosure represents a means to provide large gains in geolocation and navigation performance vs. diminishing incremental benefits from traditional GPS user equipment research topics. The goal is to be able to maintain the same level of accuracy as a GPS in GPS-unavailable environments, without adding significant system complexity, cost, or operational burdens. These gains can benefit the growing markets and applications in both the military and commercial sectors.

A robust navigation system using SoOPs is disclosed in commonly owned U.S. patent application Ser. No. 13/250, 134, titled "System and Method for Robust Navigation and Geolocation Using Measurements of Opportunity" (the "'134 Application"), and U.S. patent application Ser. No. 13/909,824, titled "Performance Improvements for Measurement of Opportunity Geolocation/Navigation Systems" ("'824 Application"), which are hereby incorporated by reference, follow this approach. The previously disclosed robust navigation system invented by the Applicant includes the use of SoOPs in a navigation solution, the application of cooperative simultaneous localization and mapping (C-SLAM) as a source measurement combining/estimation framework, the ability to synthetically time synchronize unsynchronized SoOPs, the ability to combine GPS measurements with other RF source measurements in a navigation estimation, the ability to extract and use time parameters from SoOPs, and the ability to discover and locate the position of a priori unknown SoOPs, the ability to use SLAM-derived navigation estimates in the GPS code and carrier tracking loops including extensions to other Global Navigation Satellite Systems (GNSS) sources, the ability to time tag RF signals at a node if the node local time source is not precise or available, the ability to include non-RF sources in the geolocation process, and the ability to dynamically change representation of landmarks to thus further enabling robust position, velocity and timing ("PVT") estimates through conditions of GPS signal absence. The present disclosure uses these methods to proactively manage geolocation-related processing to lower processing requirements, enabling new embodiments.

DETAILED DESCRIPTION OF THE DRAWINGS

Figure 1:
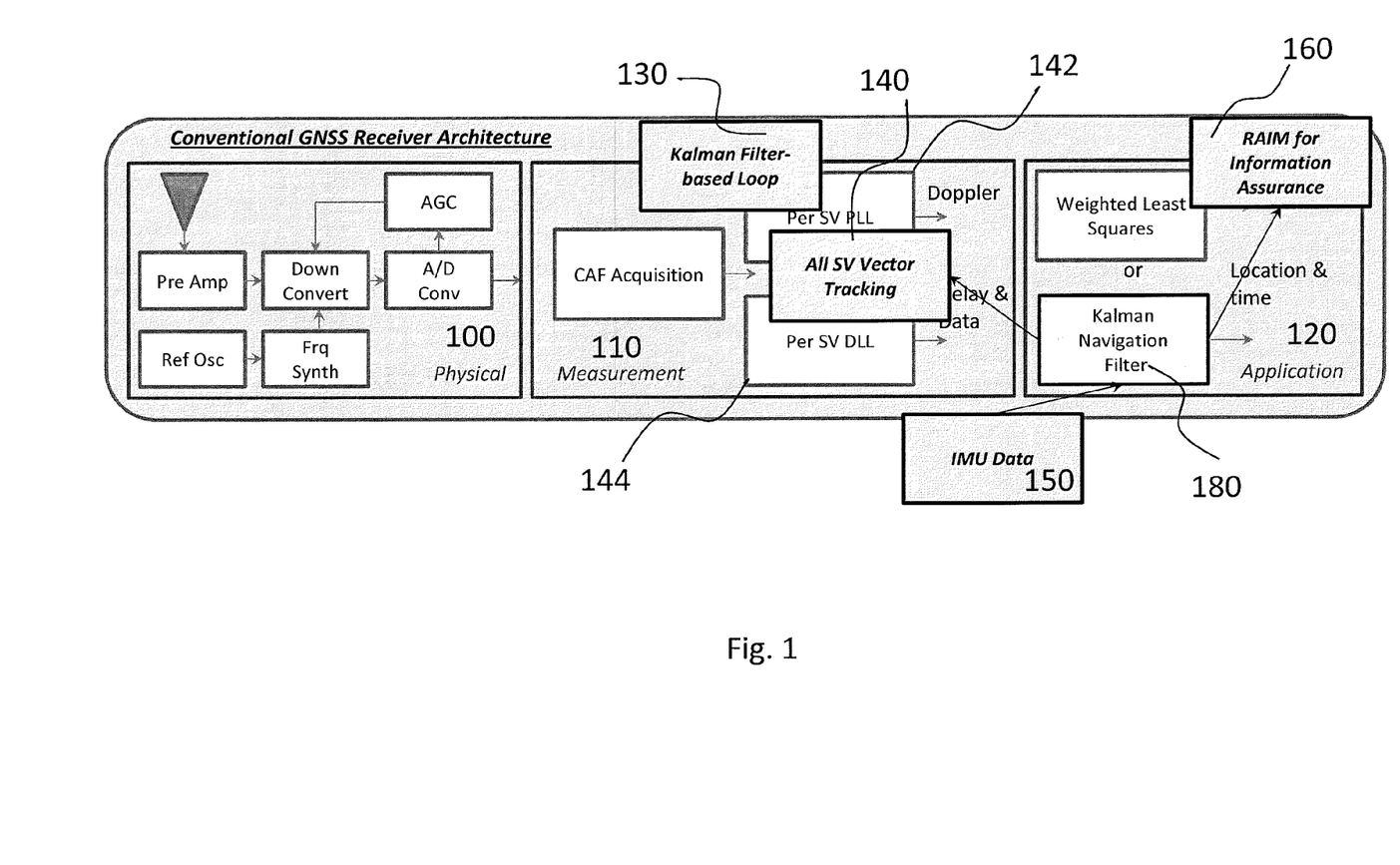
FIG. 1 illustrates a prior art traditional GNSS receiver architecture.

FIG. 1 illustrates the progression of prior art techniques for locating a mobile device. Prior art ultra-tight coupling typically used all available satellite measurements and mechanical measurements in a statistical filter framework (such as an extended Kalman filter (EKF)) to estimate the time and position of the host platform so that the carrier frequency and code phase of the navigation satellite can be accurately estimated for tracking of the navigation satellite in attenuated/multipath propagation scenarios. In describing the signal processing algorithms for software defined radio (SDR)-based global navigation satellite system (GNSS) receivers as shown in FIG. 1, a convention is used to decompose the receiver in functional layers, much like what is done with communications networks. The physical layer is defined as the functions from the antenna to the A/D converter 100, the measurement layer as the acquisition and tracking functions 110, and the application layer as the location/time estimating Kalman Filter 120. A VDFLL (vector delay frequency lock loop) is used as the basis architecture in this description. A conventional VDFLL has been well documented in the literature including in "Implementation of a Vector-based Tracking Loop Receiver in a Pseudolite Navigation System" by Hyoungmin So et al, published in Sensors in 2010.

At a high level, the state of the prior art in GPS signal processing is the use of vector tracking techniques (code phase, carrier frequency and optionally carrier code) and ultra-tight coupling of GPS to other location related mechanical measurement sources, such as IMUs. There is no disclosure of using SoOPs in a vector tracking filter to improve/enhance/substitute for positioning of a mobile device for conventional navigational satellite techniques. Vector tracking 140 is a technology that replaced individual satellite vehicle (SV) tracking loops 142, 144 to include a statistical filter, such as an EKF 130, that drive each loop oscillator for a navigational satellite. This configuration provides a means to take into account the position and motion of the User Equipment (UE) on a mobile device (which is common for each satellite) and the track of each satellite when updating the loop oscillators. In this way, high quality measurements received from some SVs can compensate for low quality measurements from other SVs in adjusting oscillators in the tracking loops. Ultra-tight coupling refers to a prior art process whereby location related measurements from non-GPS sources of a mechanical navigational nature, such as velocity from an inertial measurement unit ("IMU") 150 can be used to help update loop oscillators during periods of poor GPS reception. Ultra-tight coupling may also use statistical filtering, such as an EKF 180 to estimate UE location.

The use of EKF 130 in the tracking loops for each SV was an early innovation replacing the prior art carrier frequency tracking loop and code phase tracking delay lock loop ("DLL") 142, 144. This prior art tracking loop implementation was replaced by vector tracking 140, driven by the navigation filter EKF 180. Mechanical measurement data sources were then added to the navigation filter 150 in an ultra-tight coupling (UTC) mode. Finally, RAIM (receiver autonomous integrity monitoring)-like techniques 160 to detect anomalies were added to test measurements from the navigation EKF 180.

Figure 2:
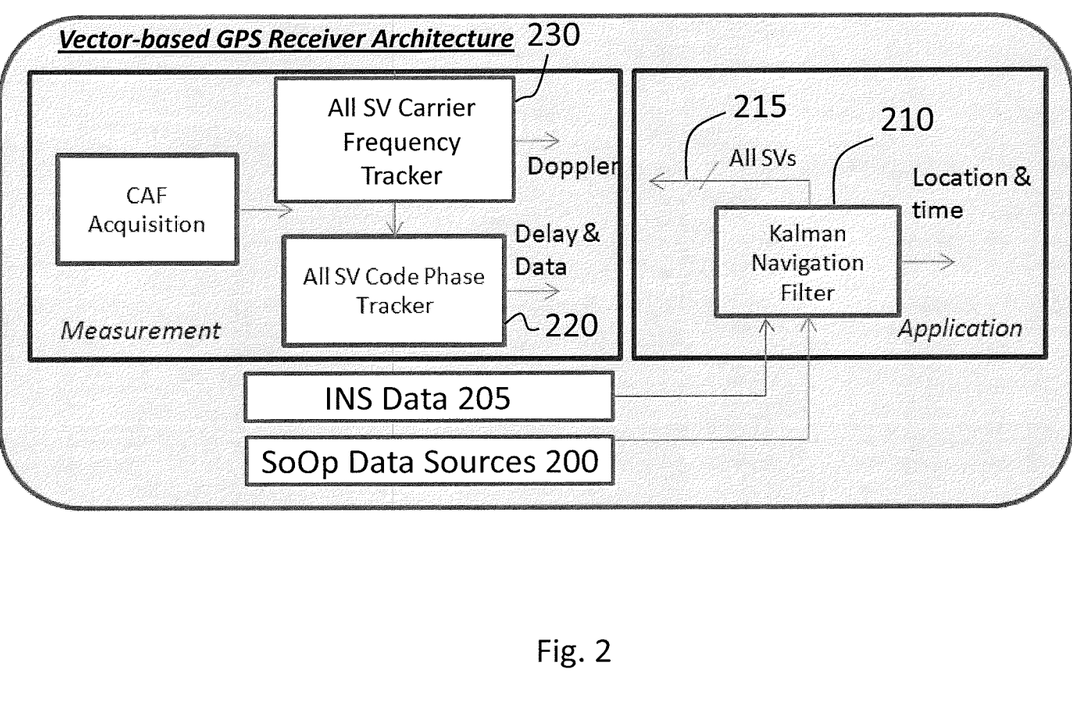
FIG. 2 illustrates one embodiment of the present disclosure showing vector tracking loops.

With reference to FIG. 2, the improvement to the prior art illustrated in FIG. 1 is the inclusion of landmark-derived data, for example optical and SoOP RF landmarks (referred to as SoOP data in the diagram) 200 and in the Kalman Navigation Filter block 210. The innovation applies the SLAM framework to serve as the basis for the EKF 210 allowing these new data sources to contribute to the state estimate. This navigation filter estimates PVT while controlling vector tracking loops 215 using GPS, inertial Navigation systems ("INS") 205 and SoOP source data 200.

FIG. 2 shows a more detailed view of the functions of the present disclosure, including the distinct loops for tracking code phase 220 and carrier frequency 230.

The '134 Application describes one embodiment of the use of SoOP data, where multiple mobile nodes (agents), equipped with SDR-based receiving assets, and interconnected via a robust ad-hoc wireless network or collaborative server, cooperate to estimate each agent location. The use of SLAM techniques was previously known for optical navigation, but Applicant's extension of SLAM techniques to RF transmissions was previously unknown. As described in the '134 Application, cooperating agents discover and make measurements on an arbitrary number of heterogeneous, unknown, unsynchronized and un-located SoOPs.

Figure 3:
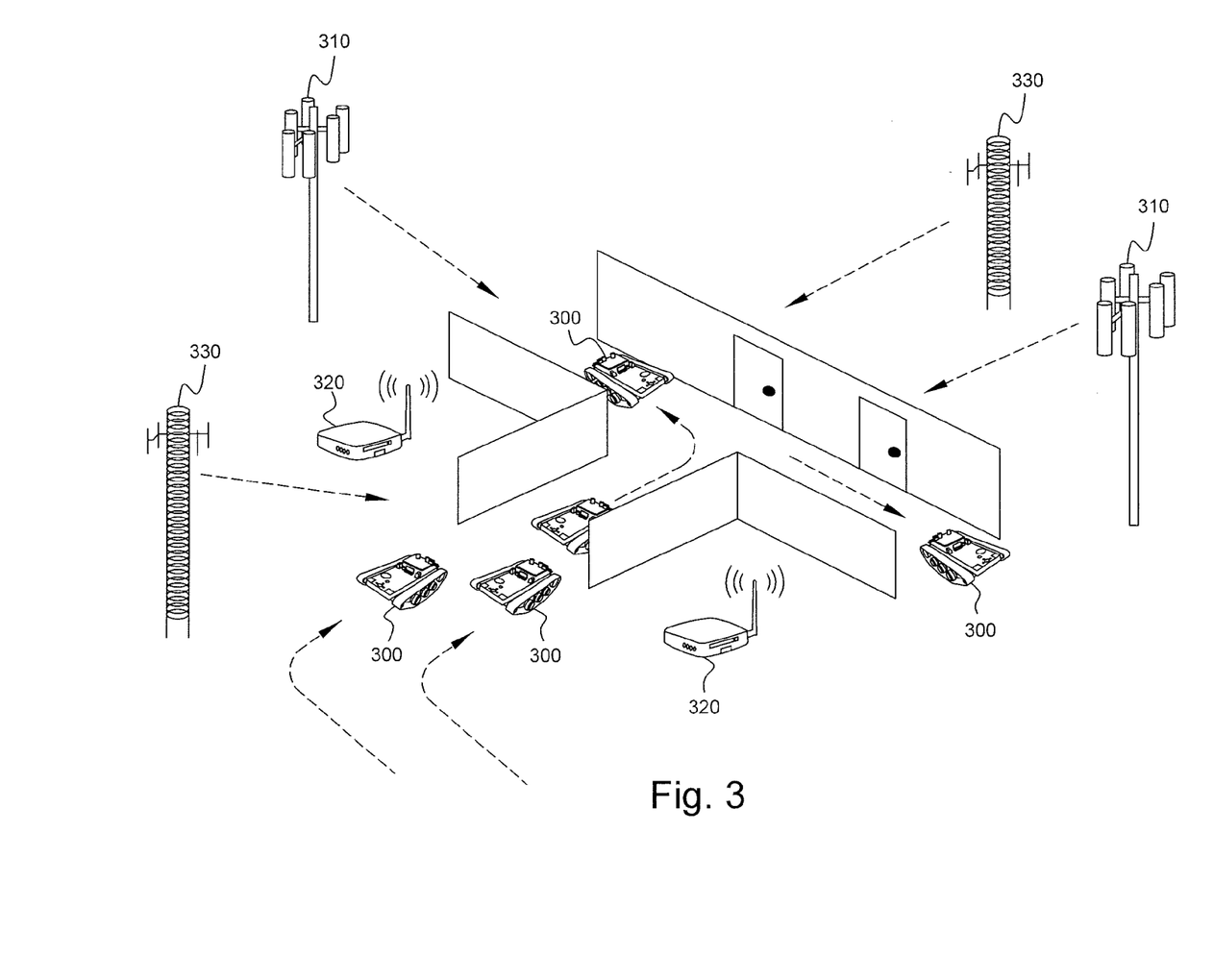
FIG. 3 illustrates a simplified pictorial representation of one example of Applicant's previous disclosure including small robotic vehicles which can navigate within the hallways of a building by signals of opportunity (SoOP).

As illustrated in FIG. 3, Applicant's previous disclosure of the use of SLAM in the RF environment can include small robotic vehicles 300 which can navigate within the hallways of a building by receiving and processing RF signals received from cell towers 310, WiFi 320 and TV broadcast SoOPs 330. SoOP existence and measurements are shared between agents to facilitate measurement making and to enable the simultaneous estimation of agent location, SoOP location, and synthetic inter-SoOP timing synchronization.

Figure 4:
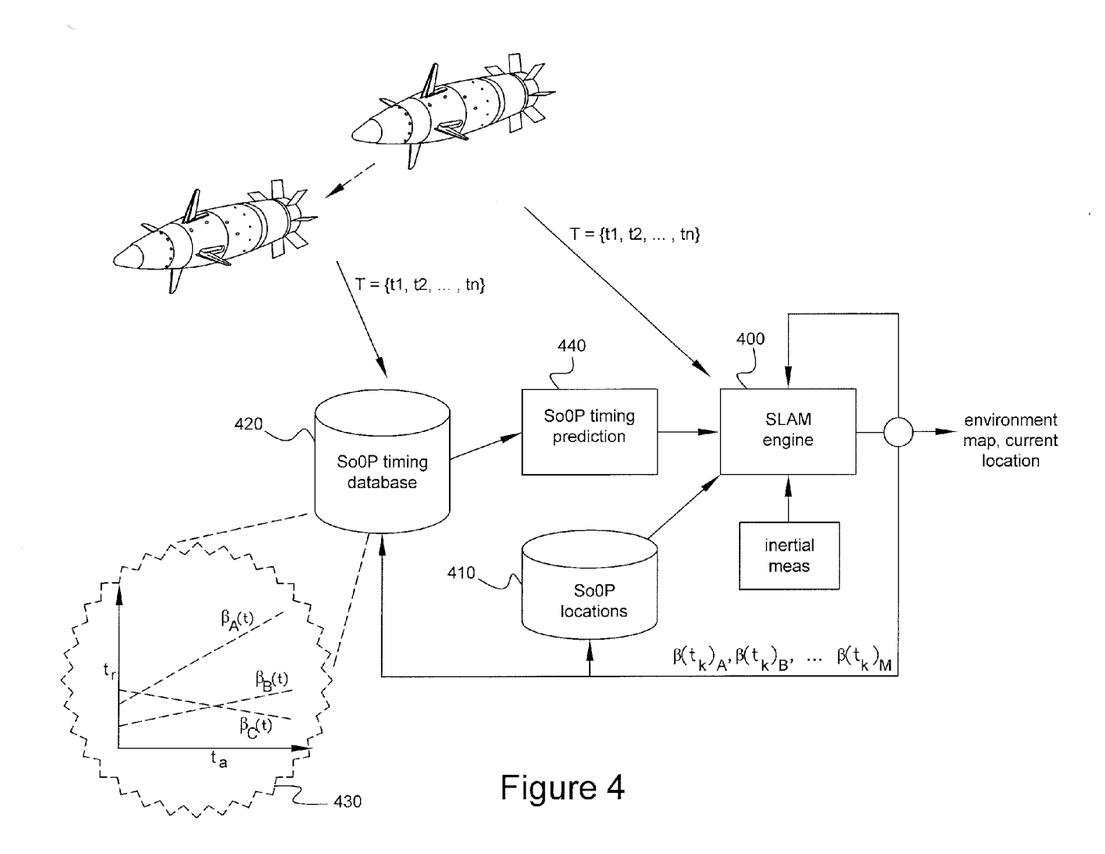
FIG. 4 illustrates a simplified flow diagram showing use of the Applicant's previous disclosure of the SMARTS (simultaneous mapping and relative timing using SoOPs) algorithm used with the present disclosure.

FIG. 4 illustrates the use of the Applicant's SMARTS (simultaneous mapping and relative timing using SoOPs) algorithm. SLAM engine 400 estimates the location of nodes and SoOP transmitters in an iterative fashion based on the past location of the nodes and SoOPs, current ranging and inertial measurements. SoOP locations are stored in database 410 and are either apriori knowledge or estimated over time by SLAM engine 400. A SoOP timing database 420 is maintained which keeps track of the absolute and relative time measurements made on SoOPs at each node 430. The data in SoOP timing data base 420 is used by SoOP timing prediction 440 to synthetically synchronize SoOP timing to allow accurate ranging to be estimated and used in SLAM engine 400. The discovery and identification of the SoOPs can use characteristics of the SoOP in the physical plane, control plane or user plane. The SoOP transmissions can also include multiple input multiple output ("MIMO") transmissions for a single physical SoOP. The SoOPs can include femotocells, repeaters, in-building distributed antenna systems ("DAS") and proximity or time-aiding beacons. These SoOPs are especially useful for indoor location applications. The interconnecting wireless network can include the WiFi standard or cellular radio standards such as GSM and UMTS using either the control or user plane. The transmitting end of the wireless communications link can also serve as a SoOP.

One embodiment of the present disclosure improves the overall performance of GNSS functionality (position, velocity, timing ("PVT") accuracy, robustness, interference immunity) by tightly coupling measurements made from additional RF signals sources such as broadcast satellite transmissions, cross-link communications from other satellites, and terrestrial transmission sources. The framework is based on combining the prior art in GNSS signal processing and the cooperative wireless network-based localization and mapping. In one embodiment, the present disclosure is directed to a novel method of an EKF navigation filter capable of controlling vector tracking loops for GNSS, and accepting measurements made from other RF-based (SoOPs) and mechanical (IMU) measurements. While the prior art received input from navigation satellites and mechanical navigational measurements, prior art systems did not receive inputs from SoOPs.

Accordingly, in one embodiment of the present disclosure, a method improves upon the prior art vector tracking and outside measurement source functionality previously described. To review, at a high level, the Applicant's previous patent applications described a cooperative wireless network-based localization and mapping system using cooperative agents who use measurements based on radio ranging, other non-radio sources (for example laser and ultrasonic), and mechanical sensors (i.e. IMU) in a joint statistical filter (EKF) to estimate all node positions and the positions of the "landmarks" in the environment. The early prior art work in this area was single agent-based, used only optical landmarks and was titled conventionally referred to as Simultaneous Localization and Measurement (SLAM). The Applicant previously extended this technology to include multiple or cooperating agents (MA-SLAM or CSLAM), and radio-based landmarks. The Applicant's navigational systems disclosed in the '134 Application allows heterogeneous mixes of unsynchronized RF signals of opportunity (SoOP) combinations and quantities (without reference stations or precise knowledge of existence or locations for the SoOPs) to produce agent location data to an accuracy of a few meters.

An improvement to Applicant's previous technology is named METEOR (Multi-sourcE navigaTion using cooperative vEctOr tRacking). Features of this algorithm utilize components of the previously describe vector-tracking frequency and delay lock loop architecture, the cooperative SLAM/EKF framework for simultaneously tracking dynamic trajectory receivers and emitters, and the SMARTS technique for tracking unsynchronized signals of opportunity. In one embodiment, features of the METEOR algorithm include:

Utilizing measurements from multiple emitter classes including GNSS and other signals of opportunity Simultaneously tracking each navigational satellite in a vector-based EKF, which provides robustness against periodic loss of signals and rapid re-acquisition Jointly computing emitter PVT parameters of emitter sources, along with receive PVT estimates Exploiting inter-communication between cooperative receivers to jointly estimate unknown emitter characteristics.

Figure 5:
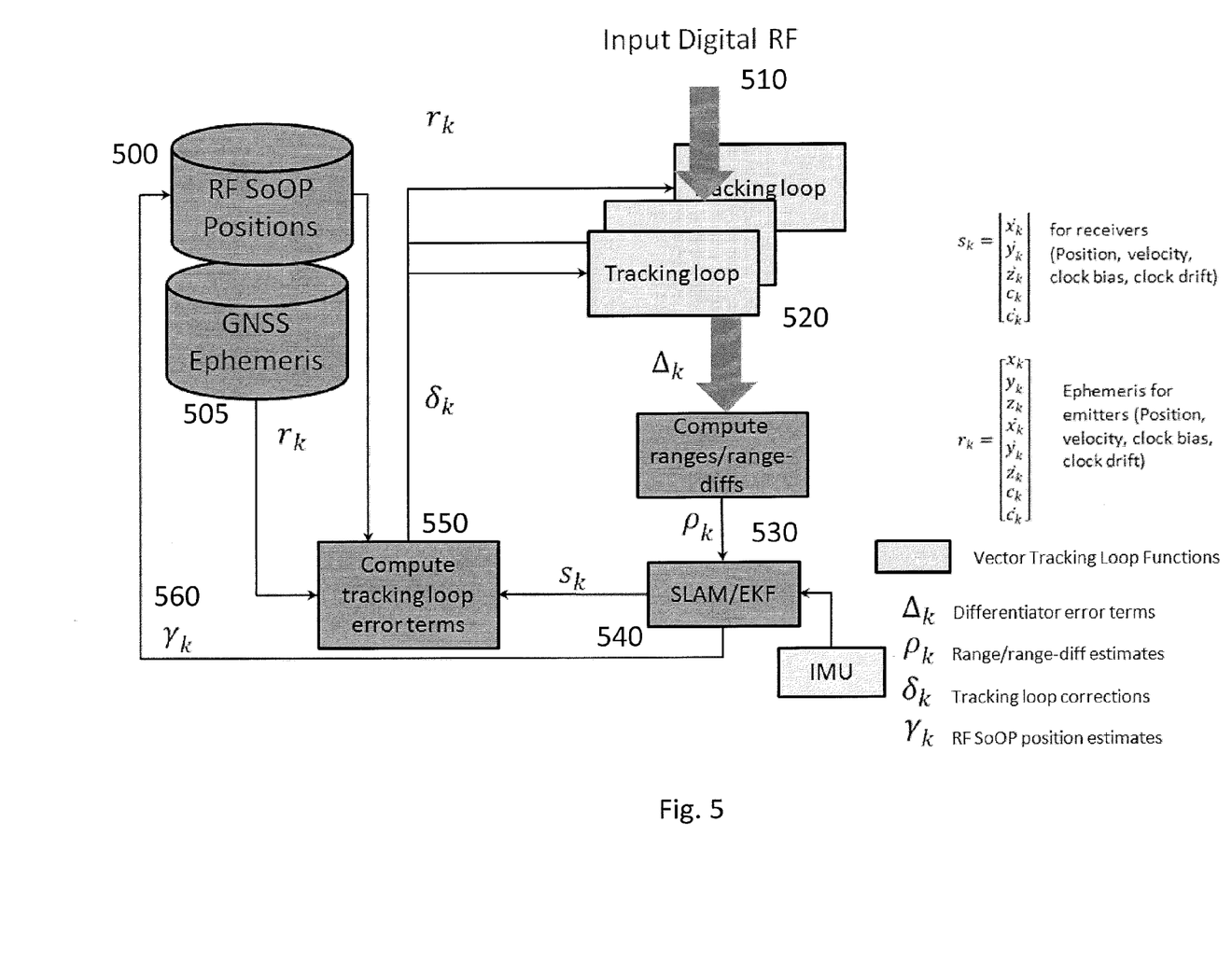
FIG. 5 illustrates a simplified flow diagram of the function of the METEOR algorithm for use with one embodiment of the present disclosure.

FIG. 5 illustrates a high-level architecture of one embodiment of the METEOR algorithm, and how it is evaluated through simulation. Databases (500, 505 contain information including GPS signal data with appropriate time varying delay and Doppler shift which is indicative of the underlying relative positions and velocities between the emitters (GPS signals and SoOP signals) and the receiver. In operation, digitized signal data 510 is passed to the vector tracking loops 520 which are established for each unique emitter source. The tracking loops (520) provide error terms $\Delta_k$ for each of the k loops, from which pseudoranges $\rho_k$ are computed 530. The pseudoranges are passed to the SLAM/EKF engine 540, from which the receiver state vector $s_k$ is updated based on the current measurements and the model predictions. Using the current state vector and the GPS orbital ephemeris data $r_k$, tracking loop corrections $\delta_k$ 550 are computed which are fed back into the tracking loops. In addition if any non-GPS signals are used in the estimate, the updated SoOP position and timing estimates $\gamma_k$ 560 can be fed into the database which tracks the SoOP positions.

There are many advantages of METEOR over a conventional Vector Tracking Loop (VTL) GPS navigation. Prior art VTL navigation systems have been widely accepted as a suitable navigation algorithm for the tracking portion in GPS-based navigation. Prior to tracking, the GPS receiver must acquire the satellites and from this initial position estimate, attempt to continue to track the satellites over time. The only actual difference between tracking and acquisition is the correlation period used. For acquisition, typically a short correlation period of 10 ms or less is used since the navigation data bit-periods (20 ms period), which cause phase reversals, is unknown. Extending the correlation beyond half of a bit period would cause poor correlation due to a mid-correlation window phase reversal. After acquisition, position and navigation data bits are recovered, which allow longer duration averaging to be used in the tracking mode. Increasing the tracking duration lowers the noise power, thus allowing the receiver to continue to produce position estimates in the presence of low SNR. Furthermore, once in tracking mode, it is possible for the receiver to periodically lose satellite reception and recover the signal at a later time without resorting back to acquisition mode based on the predicted delay and frequency provided by the estimated receiver position.

Acquisition: In one embodiment of the present disclosure, the acquisition component of a VTL or conventional receiver is the same, in which a matched filter is processed in time and frequency against known transmitted signals, such as C/A codes in the GPS case. However, use of the METEOR method with this embodiment improves acquisition performance since initial position and time could be estimated from SoOP sources. In effect, once an initial position is coarsely known using SoOp sources, METEOR effectively enters the higher-sensitivity tracking mode without actually requiring a conventional GPS acquisition stage as in the prior art. An important feature of this embodiment is the ability to derive accurate timing from the SoOP sources. However, under this current embodiment, even acquisition of a single satellite would provide this information, allowing the receiver to switch to tracking mode more quickly and in otherwise impossible conditions for even a VTL-based GPS receiver.

Tracking: In another embodiment, tracking performance of the METEOR method is improved over conventional VTL in several aspects scenarios.

1) In prior art systems, GPS blockage could result in only a subset of satellites to be received on one side of the earth, resulting in poor satellite geometry, or high DOP (Dilution of Precision). With the current disclosure, using SoOPs to augment GPS, could improve DOP, even if the measurements themselves are inferior to GPS accuracy, thereby improving overall position accuracy.

2) Along the same lines as 1), as the number of measurements used to estimate PVT increases, overall position and velocity accuracy improves even if the additional measurements have inferior accuracy when compared with GPS.

3) The present disclosure allows the use of GPS pseudo ranges even where there are fewer than four measured satellites, unlike with a conventional GPS receiver. Because GPS satellites, in the absence of high multipath, offer high accuracy position data, these provides some benefit to the overall position estimate when paired with lower-quality measurement data that could be derived from SoOPs.

METEOR Mathematical Derivation: In another embodiment, the derivation of the METEOR method illustrates the improvements over the Applicant's previously disclosed SMARTS algorithm. In one embodiment, the METEOR method efficiently represents and manipulates all clock biases and drifts in the context of the EKF state vector. This section expands on the derivation of generic range and range-difference measurement EKF, and applies it specifically to the GPS and SoOP problem. GPS is discussed here, although the derivation can apply to any GNSS system. This derivation fills in a key deficiency in the prior art methods by deriving a EKF variant which combines the inputs from GPS and SoOP sources. The use of an EFK in the navigation context is known as shown by J. J. Spilker, Jr., Global Positioning System: Theory and Applications, Volume 1, Progress in Astronautics and Aeronautics, B. W. Parkinson, Ed. Washington, D.C.: American Institute of Aeronautics and Astronautics, 1996, vol. 163. Hyoungmin, S., et al, "Implementation of a Vector-based Tracking Loop Receiver in a Pseudolite Navigation System" Sensors 2010 Lashley, M, "Kalman Filter Based Tracking Algorithms for Software GPS Receiver", Master's Thesis, Auburn University, however there is no disclosure in the prior art of advantageously using SoOPs to enhance tracking capability particularly as it relates to GPS unavailable environments.

The basis for the prior art work uses PVT differences (Position, Velocity, Time differences) provided by mechanical navigational resources, such as inertial measurement units (IMU), directly provided to the EKF. An EKF even partially based on the delta-PVT (PVT difference) model is inferior in its navigation capability in comparison to an EKF that used the PVT directly as its state. This derivation is described below.

Using a discrete time formulation, time indices are denoted by the subscript k where the time instants are separated by a specified time at, which typically in this analysis is set to 1 second. The derivation will be described with respect to a state vector $s_k$ and a measurement vector $m_k$. The state vector is a tall vector composed of positional information, positional rate of change with respect to time (velocity component) information, GPS clock bias and clock bias rate of change with respect to time (clock drift rate). The state vector can then be written as:

$$s_k = \begin{bmatrix} x_k \\ y_k \\ z_k \\ \dot{x}_k \\ \dot{y}_k \\ \dot{z}_k \\ c_k \\ \dot{c}_k \end{bmatrix} \quad 1)$$

The first three components of the vector are the positional components in three dimensions. The next three are the rate of change of these components. The seventh component is the clock bias and the lowermost component is the rate of change of the clock bias. The measurement vector is also a tall vector and is composed of three components. The first is the set of computed pseudo-ranges to a fixed set of GPS satellites. The third measurement vector component is the set of ranges computed to the SoOP sources. In one embodiment, the only measurement feeding into the EKF from the correlators is the set of pseudo-ranges. One can also visualize a set of correlators that feeds the EKF with the ranges to the SoOP sources if in fact we wish to view both sets of measurements being derived within a similar mathematical framework.

The state vector is updated linearly as follows:

$$s_{k+1} = F_k s_k + G_k w_k \quad 2)$$

Where $F_k$ expresses the state update in a matrix with known and in this analysis generally fixed terms. The suffix k allows for the time dependence nature of the state vector. The state update matrix $F_k$ can be written as:

$$F_k = \begin{bmatrix} 1 & 0 & 0 & \Delta t & 0 & 0 & 0 & 0 \\ 0 & 1 & 0 & 0 & \Delta t & 0 & 0 & 0 \\ 0 & 0 & 1 & 0 & 0 & \Delta t & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0t \\ 0 & 0 & 0 & 0 & 0 & 0 & 0 & 1 \end{bmatrix} \quad 3)$$

The matrix $G_k$ is a known matrix (possibly approximated as a unit matrix of the same dimensions) and $w_k$ is an independent zero mean Gaussian white process with covariance $$E(w_k w_k^T) = Q_k \quad 4)$$

The measurement vectors are a non-linear function of the state:

$$m_k = h(s_k, v_k) \quad 5)$$

In which $v_k$ is an independent zero mean Gaussian white process with covariance $$E(v_k v_K^T) = R_k \quad 6)$$

The measurement vector is composed of three components:

$$m_k = h(s_k, v_k) = \begin{pmatrix} \rho_k \\ r_k \end{pmatrix} = \begin{bmatrix} h_1(s_k, v_k) \\ h_2(s_k, v_k) \end{bmatrix} \quad 7)$$

where the first is the set of computed pseudo-ranges and the second is the set of ranges to the sources of the SOOPs. Also note that the function $h_1(s, v_k)$ can be approximated by the exact pseudo-range calculation given by $\phi(x_k) + v_k$ where $\phi(x_k)$ is the function that converts the state information into pseudo-ranges; and similarly for $h_2(s_k, v_k)$ where a direct calculation of the measurements to the SoOPs is possible given the state (or estimated state). Generally speaking both of these functions are non-linear.

The GPS clock at the receiver is considered to random walk with update equation:

$$\begin{bmatrix} c_{k+1} \\ \dot{c}_{k+1} \end{bmatrix} = \begin{bmatrix} 1 & \Delta t \\ 0 & 1 \end{bmatrix} \begin{bmatrix} c_k \\ \dot{c}_k \end{bmatrix} + w_{ck} \quad 8)$$

where the noise vector $w_{ck}$ has a covariance matrix given by $$Q_c = E(w_{ck} w_{ck}^T) = \begin{bmatrix} S_b \Delta t + S_f \left(\frac{\Delta t^3}{3}\right) & S_f \left(\frac{\Delta t^2}{2}\right) \\ S_f \left(\frac{\Delta t^2}{2}\right) & S_f \Delta t \end{bmatrix} \quad 9)$$

The noise spectral amplitudes $S_b$ and $S_f$ can be related to the Allan variance parameters. The approximations we use for these are h_0=2e-19; h_2=2e-20; $S_b$=8$\pi^2$; h_2=$S_f$*h_0. The clock parameters are in units of meters and meters per second. The random walk of the clock used in our simulations is based on the clock update and covariance matrices given above. We note that the clock update and the relevant covariance matrix are embedded in the matrices $F_k$ and $Q_k$ that have been previously discussed. Other models for the clock behavior can be easily considered in the same framework. estimated state). Generally speaking both of these functions are non-linear.

The measurement vector can be linearized around some start state $x_k^0$ with zero noise level to give $$m_k \cong h(s_k^0) + H_k(s_k - s_k^0) + I_k v_k \qquad 10)$$

Where $$H_k = \frac{\partial h(s, v)}{\partial s}$$

evaluated at $(s_k^0, 0)$ and $$I_k = \frac{\partial h(s, v)}{\partial v}$$

evaluated at $(s_k^0, 0)$. We note that with this linearization, the equations for the state update and the measurement are now identical to those for a linear Kalman filter except for the bias terms. Thus in the proximity of a solution to the state and measurement equations, a linear biased model can be used to define the system operation. In particular we can note that the conditional covariance of $m_k$ given the entirety of past measurements $M_{k-1}=[m_{k-1}, m_{k-2}, \ldots]$ is unaffected by the bias terms and is thus dependent only on $H_k$. In general let us denote $M_k$ as the entirety of past measurements inclusive of $m_k$ similar to the definition of $M_{k-1}$. Let us define the conditional estimate $s_k^+ \equiv E[s_k/M_k]$ and similarly, $s_k^- \equiv E[s_k/M_{k-1}]$.

Also define the covariance matrices $$P_k^+ \equiv \text{Cov}(s_k/M_k) \text{ and } P_k^- \equiv \text{Cov}(s_k/M_{k-1}) \qquad 11)$$

The conditional vector $[(s_k/M_k)^T/M_{k-1}]$ is then Gaussian with mean $[s_k^- H_k s_k^+]^T$ and covariance matrix $$\begin{bmatrix} P_k^- & P_k^- H_k^T \\ H_k P_k^- & U_k \end{bmatrix}$$

where $$U_k = H_k P_k^+ H_k^T + R_k \qquad 12)$$

It is then straightforward to show that $(x_k/Z_k)$ is Gaussian with mean $$s_k^+ = s_k^- + P_k^- H_k^T U_k^{-1}(m_k - h(s_k, 0)) \qquad 13)$$

and covariance matrix $$P_k^+ = P_k^- + P_k^- H_k^T U_k^{-1} H_k P_k^- \qquad 14)$$

One reason for the weaker performance of the prior art delta-PVT model may be due to the fact that one cannot use the exact non-linear calculation $h(s_k, 0)$ and must resort to once again using the matrix $H_k$. Thus, in one embodiment, the latter matrix is used both in the measurement linearization and in the measurement update thus resulting in a double use of the same approximation. In addition most noise terms are also differenced resulting in larger variances.

The previous two equations represent the measurement update of the EKF in one embodiment. Further, we can write $$s_{k+1}^- = E[s_{k+1}/Z_k] = F_k s_k^+ \qquad 15)$$

and $$P_{K+1}^- = F_k P_k^+ F_k^T + G_k Q_k G_k^T \qquad 16)$$

where these last two equations represent the time update step of the EKF. There is some variation in the literature as to the order in which these updates are applied. In one embodiment the state update can be applied first and the measurement update second (this only matters in terms of aligning the estimated state to the actual state for comparison purposes).

The EKF can continue to be updated, successfully maintaining the needed linearity as long as the estimated state is close enough to the actual state and a sufficient number of measurements made are close enough to the measurements corresponding to tracking the state. For this to hold up then the measurement vector, or at least some sufficient number of the measurements, must closely represent the proper measurements given the state. This is where the interaction between the navigation aspect of the problem and the tracking aspect exhibits itself. There must thus be some input from the navigation module to the tracking module that permits the tracking module to turn around and provide a measurement vector that has adjusted for the changes in the state vector of the navigation module. One way to achieve this end is to suitably adjust the PN sequences in a manner reflective of the state updates. In Lashley prior art, this is achieved this by passing a predicted input to the tracking module that allows the tracking module to update its PN sequences (possibly in terms of clock frequency but certainly in terms of clock phase).

The EKF within the Vector Tracking Loop Architecture: In another embodiment, an improvement over the prior art feedback loop is to have the PN correlators maintain a quality measure along with the pseudo-range measurements. When the quality measure for any given PN correlator drops below a specified threshold, that pseudo-range is dynamically dropped from the EKF measurement inputs. Further, when the quality measure is below threshold, the EKF state estimate is used to derive an estimate of the proper alignment required at the PN correlators and this estimated alignment is maintained until the quality measure exceeds the threshold. Conversely when the quality measure is above the threshold the PN correlators do not take input from the estimated EKF state to maintain synchronism; rather they operate autonomously.

Hyper-time processing: In another embodiment of the METEOR method, another significant improvement over the prior art is the computational savings associated with a mode of operating in which the navigation receiver periodically reverts to an idle state once acquisition is completed and tracking has begun. In one embodiment, after a configurable period of time, the receiver may resume processing and continue where it left off, provided that good estimates of PVT of the mobile device have already been achieved. In prior art, it was common to use ultra-tight coupling/vector tracking approaches to improve the performance of GNSS receivers when GPS reception conditions are impaired. In those cases, the vector tracking filters operated with the assistance of the EKF continuously through the GPS reception impairment. An improvement over this prior art approach is that the vector tracking loop computations of the present disclosure may be intentionally stopped (the EKF computations continue) to reduce computational load. In one embodiment, the vector tracking architecture is able to pick up from where it left of at any later time without reacquisition. The idle period duration may be a function of the dynamics of the emitter platforms, the receiver platform, and the quality of the tracking. Provided that the vector tracking loops accurately predict the states at a future time, and that the time stamps are accurate, tracking should resume normally despite essentially being idle for brief periods of time.

This contrasts with the architecture of most prior art navigation systems in which processing of the received signals must be continuous, and the tracking loops are continuously running.

In another embodiment, the vector tracking filters may be updated based on only the mechanical navigation measurements provided by a local inertial measurement unit and/or SoOP data during the idle period, which would serve to further stabilize the state prediction once new receiver measurements become available. This alternative embodiment would still offer considerable processing savings due to the fact that the correlator functions would be disabled during the idle period, which is what consumes the majority of the processing resources when compared to simply updating the tracking filter states.

Figure 6:
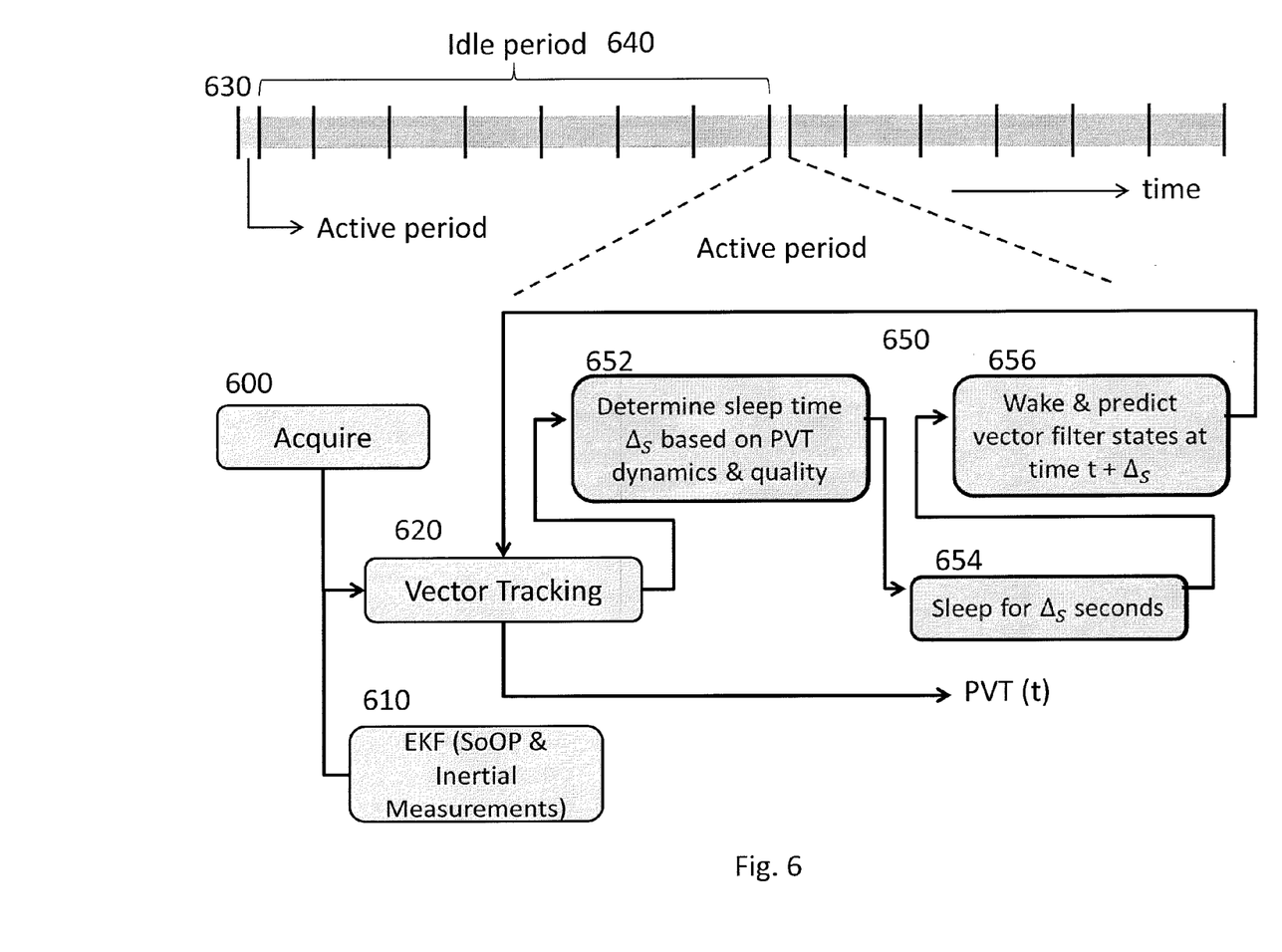
FIG. 6 illustrates the a simplified flow diagram of the function of the Hyper-time algorithm for use with one embodiment of the present disclosure.

FIG. 6 illustrates the operation of the Hyper-time method. The acquisition process 600 and/or SoOP/inertial measurements used in the EKF 610 provide the control for the oscillators in the vector tracking loops 620. Based on some criteria, the vector tracking loops operate at some duty cycle. The duty cycle is illustrated in the timeline at the top of the figure with the active period being represented by the small time increment 630 and the idle period being represented by the long time period 640. Many methods could be used to determine the vector filter duty cycle including a fixed period, or a variable period based on a number of different criteria including quality of the current estimates, power budgets, location/accuracy requirements, etc. A high level depiction of this process is shown in the three boxes 650 where first a process determines the sleep time (no processing) 652, a second process puts the tracking loops to sleep 654, and a third process wakes the loops to again begin processing based on a wake up criteria 656.

Figure 7:
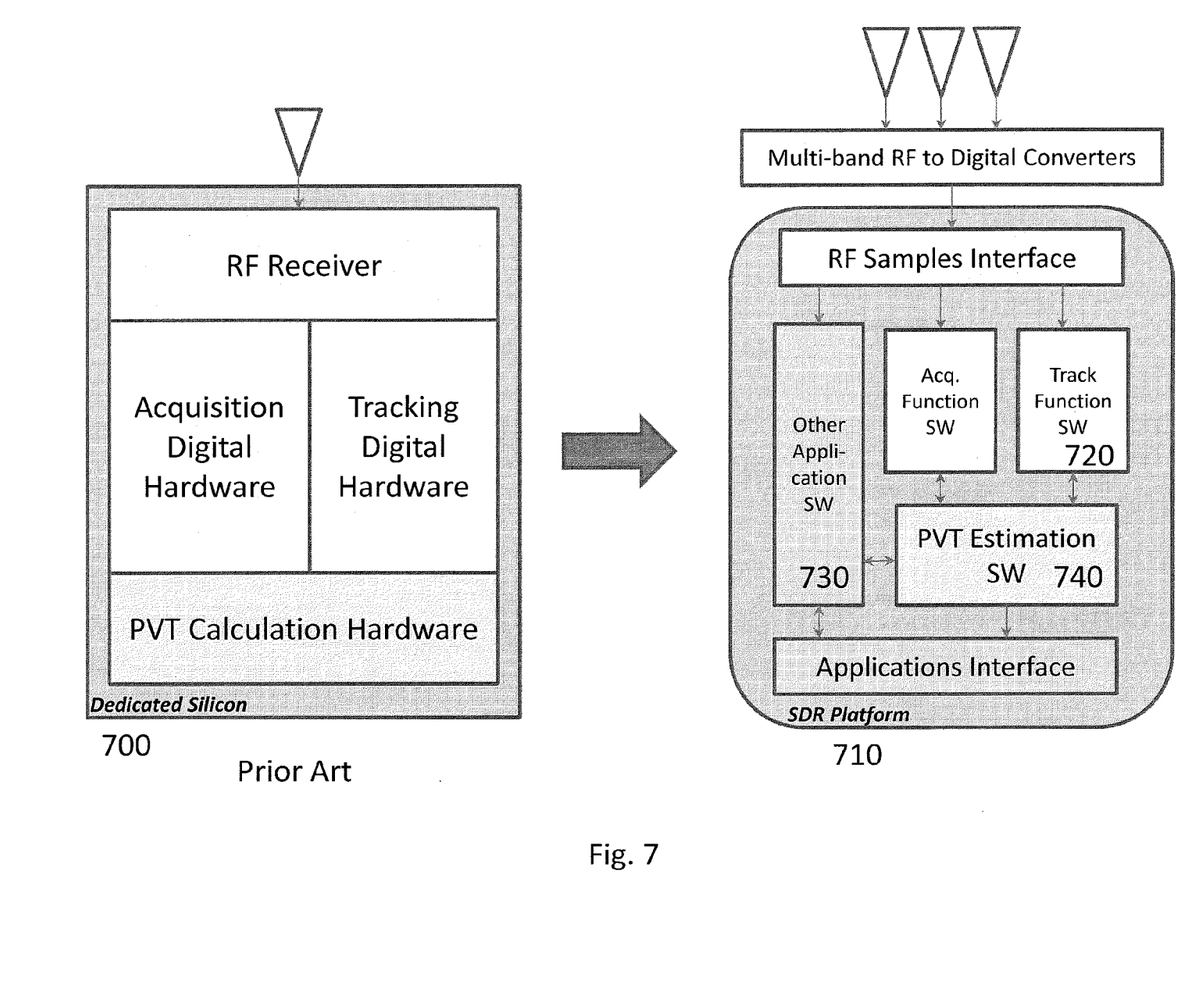
FIG. 7 illustrates the progression of global navigation satellite system receiver architectures from dedicated silicon based of the prior to software defined radio (SDR) architecture that is used with an embodiment of the present disclosure.

The present disclosure leverages the strategic movement to SDR technology being pursued by both commercial and military developers of RF systems. Communications and sensing (radar, ISR, etc.) applications have moved much of their development efforts into SDRs, and (position/navigation/timing) PNT systems can benefit from this maturing technology. An illustration is shown in FIG. 7 of the migration from dedicated silicon of the prior art to SDR basis for a PNT system. Referring to the figure, the key functions of a prior art dedicated silicon implementation are shown in 700. One embodiment of the present disclosure of an SDR-based platform is shown in 710 with the software-based functions of tracking and PVT estimation shown in 720 and 740. SoOP-related processing (as well as other applications like communications) are shown in 730. Note that in this architecture, new signal processing methods such as those described in the present invention can be easily added to the PNT functionality application operating on the SDR platform.

A key recent development in SDR usage is the merging of applications (for example communications and navigation) onto common SDR platforms. This is well underway in the smart phone industry where data from multiple communications services (cellular, WiFi, bluetooth, etc.), and sensing technologies (camera phones, IMUS, etc.) are processed in common general purpose processor/graphic processor unit/digital signal processor (GPP/GPU/DSP) machines. As an example, Nvidia has recently unveiled its next generation smart phone processor which includes four 1.9 GHz Arm A15 CPU cores, 72 GPU cores, and an integrated Icera LTE/WCDMA "soft-modem" capable of 1.2 Trillion operations per second. The soft-modem contains 8 programmable processors and replaces traditional designs that dedicate die space on the chip to specific protocol processing that cannot be modified or upgraded, and consume a significant amount of a smart phone power budget.

If PNT functions could be moved to shared SDR platforms, significant savings in size, weight, power, and cost (SWAP-C) are possible. An impediment to this migration in the prior art has been the need for PNT devices to "stare" at radio navigation signals; and the traditional GPS receiver signal processing algorithms which tend to be computationally intensive, time critical and non-conditional. The Hyper-time processing of the current disclosure removes these impediments and allows the use of non-traditional algorithms which are well suited to GPP/DSP/GPU machines. In addition to the SWAP-C benefits, the availability of SDR-type processing and access to other data sources provides a means to significantly improve PNT performance in challenging propagation environments, and detect/mitigate interference, all while providing a platform that minimizes power consumption affording a robust navigational capability that was not available in the prior art.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Those skilled in the art will appreciate that the present invention can be practiced by other than the described embodiments, which are presented for the purposes of illustration and not of limitation, and the present invention is limited only by the claims which follow.

What is claimed:

1. A method of determining the location of a mobile device, comprising;
    estimating a first position, velocity and timing (PVT) data of a mobile device and an associated quality metric from navigation satellite positioning data;
    receiving a first signal of opportunity (SoOP) at the mobile device, wherein the SoOP is an ambient radio frequency (RF) transmission that is not intended for navigation, position or timing purposes;
    estimating a second PVT data of the mobile device from the received SoOP;
    comparing the quality metric to a threshold;
    if the quality metric is greater than or equal to the threshold, implementing a vector tracking loop using the first PVT data to provide a first satellite tracking parameter data;
    if the quality metric is less than or equal to the threshold, implementing a vector tracking loop using the second PVT data to provide a second satellite tracking parameter data;
    tracking a navigation satellite using the first or second satellite tracking parameter data;

receiving navigation signals from the tracked navigation satellite; and determining a third estimated PVT data for the mobile device from the received navigation signals.

2. The method of claim 1 wherein step of implementing the vector tracking loop using the second PVT data to provide a second satellite tracking parameter data uses data received from an inertial measuring unit of the mobile device.

3. The method of claim 1 further comprising wherein the third estimated PVT data for the mobile device is provided to the vector tracking loop to provide a third satellite tracking parameter data.

4. The method of claim 1 wherein the first SoOP is at least one of a television broadcast, a cellular base station broadcast, a WiFi access point, or a satellite broadcast downlink.

5. The method of claim 1 further comprising the steps of continuously determining a navigation satellite tracking parameter data while selectively disabling the tracking of the navigation satellite for a predetermined period of time in order to conserve power consumed by the mobile device.

6. The method of claim 5 wherein the predetermined period of time is a function of the quality of the third estimated PVT data.

7. A system for tracking the location of a mobile device, comprising:
- a database of signals of opportunity (SoOPs) data received at a mobile device;
- a navigation satellite positioning receiver for providing a first position, velocity, timing (PVT) data of a mobile device and an associated quality metric;
- an inertial navigation system associated with the mobile device;
- an extended Kalman filter receiving input from the inertial navigation system and the database to provide second PVT data of the mobile device;
- a vector tracking loop for receiving the first PVT data if the quality metric is greater than or equal to a threshold to provide a first satellite tracking parameter data for the satellite positioning receiver, and for receiving the second PVT data if the quality metric is less than or equal to the threshold to provide a second satellite tracking parameter data for the satellite positioning receiver;
- a processor programmed to disable the vector tracking loop for a predetermined period of time in order to conserve power consumed by the mobile device;
- wherein the extend Kalman filter provides third PVT data for the mobile device during the period in which the vector tracking loop is disabled.

8. The system of claim 7 wherein the predetermined period of time is a function of a quality of the estimated PVT data.

9. The method of claim 1 wherein the step of implementing a vector tracking loop using the first PVT data also uses the second PVT data to provide the first satellite tracking parameter data.

10. The method of claim 1 wherein the step of estimating the second PVT data for the mobile device is determined using the received SoOP and measurements from an inertial measuring unit.

11. The method of claim 10 wherein the step of estimating the second PVT data for the mobile devices includes using a Kalman filter.

12. The system of claim 7 wherein the first or second satellite tracking parameter data is used by the satellite positioning receiver for providing a fourth PVT data.

* * * * *